US008481116B2

(12) United States Patent
Bleibler et al.

(10) Patent No.: US 8,481,116 B2
(45) Date of Patent: Jul. 9, 2013

(54) METHOD FOR PRODUCING A COATED BASIC MATERIAL FOR A HYDRAULIC COMPOSITION, COATED BASIC MATERIAL FOR A HYDRAULIC COMPOSITION, ADDITIVE FOR A HYDRAULIC COMPOSITION AND METHOD FOR PRODUCING A HYDRAULIC COMPOSITION

(75) Inventors: Alexander Bleibler, Winterthur (CH); Urs Mäder, Frauenfeld (CH); Alexander Stücheli, Winterthur (CH); Christian M. Bürge, Schafisheim (CH); Ralf Beissel, Saarburg (DE); Beat Schnider, Luzern (CH)

(73) Assignee: Sika Technology AG, Baar (CH)

( * ) Notice: Subject to any disclaimer, the term of this patent is extended or adjusted under 35 U.S.C. 154(b) by 696 days.

(21) Appl. No.: 11/661,107

(22) PCT Filed: Sep. 6, 2005

(86) PCT No.: PCT/EP2005/054397
§ 371 (c)(1),
(2), (4) Date: Feb. 12, 2009

(87) PCT Pub. No.: WO2006/027363
PCT Pub. Date: Mar. 16, 2006

(65) Prior Publication Data
US 2009/0199741 A1 Aug. 13, 2009

(30) Foreign Application Priority Data

Sep. 6, 2004 (EP) .................................. 04104286
May 11, 2005 (CH) ........................................ 836/05
Aug. 17, 2005 (CH) ...................................... 1353/05

(51) Int. Cl.
*B05D 7/00* (2006.01)
*C04B 7/00* (2006.01)
*C04B 14/00* (2006.01)
*C04B 24/00* (2006.01)
*C04B 9/04* (2006.01)
*C04B 11/00* (2006.01)
*C04B 28/14* (2006.01)
*C04B 40/00* (2006.01)

(52) U.S. Cl.
USPC ........... 427/220; 427/215; 106/608; 106/778; 106/819

(58) Field of Classification Search
USPC .................. 427/215, 220; 106/608, 778, 819
See application file for complete search history.

(56) References Cited

U.S. PATENT DOCUMENTS 2,056,387 A 10/1936 Canon et al.
2,221,175 A * 11/1940 Bechtold ....................... 106/659

(Continued)

FOREIGN PATENT DOCUMENTS
DE 1 296 612 A1 6/1969
DE 2 254 668 A1 5/1974

(Continued)

OTHER PUBLICATIONS

Dec. 18, 2012 Office Action issued in Japanese Application No. 2010-262970 (with English translation).

Primary Examiner — Kaj K Olsen
Assistant Examiner — Karam Hijji
(74) Attorney, Agent, or Firm — Oliff & Berridge, PLC

(57) ABSTRACT

The invention relates to a method for producing a coated basic material for a hydraulic composition (11) comprising a basic material (14, 16) and water (15). According to the invention, the basic material can consist of several sub-groups (14, 16) and at least one hydraulic binding agent (14) and to produce the hydraulic composition the basic material (14, 16) and the water (15) are mixed in a mixer (8). Prior to the mixing of the hydraulic composition, the basic material (14, 16) is at least partially coated with an additive (13). The invention also relates to a coated basic material to be used in concrete production, to an additive for concrete production and to a method for producing a hydraulic composition.

40 Claims, 11 Drawing Sheets

U.S. PATENT DOCUMENTS

Figure 1:
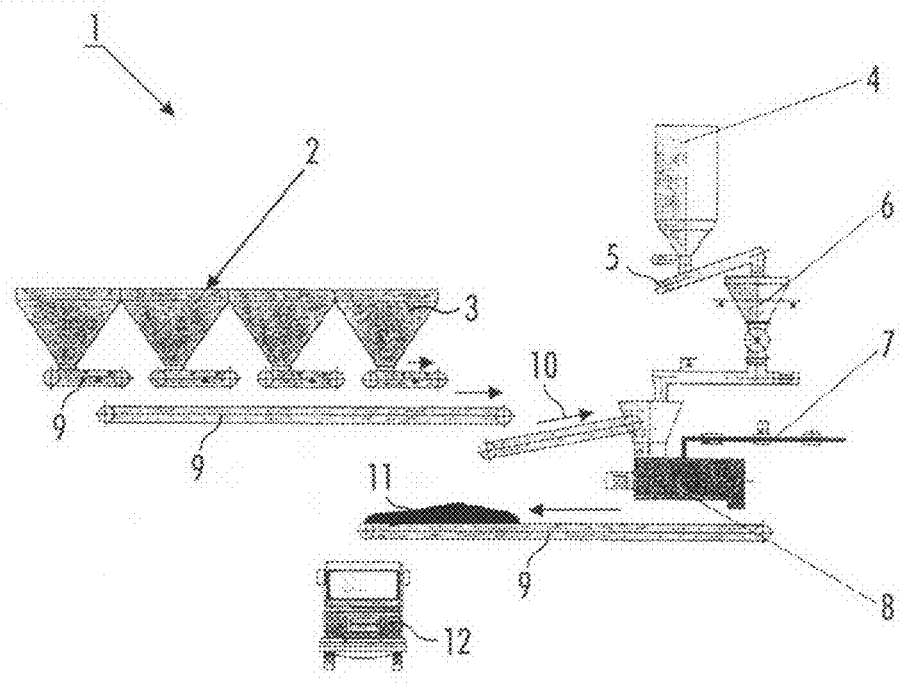

| | | | |
|---|---|---|---|
| 2,307,741 A | | 1/1943 | Goldstein et al. |
| 3,323,928 A | * | 6/1967 | Weisfeld .................. 106/18.35 |
| 3,856,542 A | | 12/1974 | Aignesberger et al. |
| 4,141,316 A | | 2/1979 | Grun |
| 4,405,372 A | * | 9/1983 | Serafin et al. ................. 106/727 |
| 5,236,501 A | * | 8/1993 | Nomachi et al. .............. 106/723 |
| 5,766,323 A | | 6/1998 | Butler et al. |
| 2002/0007019 A1 | * | 1/2002 | Schober et al. ............ 525/330.5 |
| 2003/0089281 A1 | * | 5/2003 | Berke et al. ................... 106/713 |
| 2003/0127026 A1 | * | 7/2003 | Anderson et al. ............. 106/724 |

FOREIGN PATENT DOCUMENTS

| | | |
|---|---|---|
| DE | 26 02 454 A1 | 7/1977 |
| EP | 0 290 394 A1 | 11/1988 |
| EP | 0 635 463 A1 | 1/1995 |
| EP | 0 941 975 A1 | 9/1999 |
| EP | 0 957 071 A1 | 11/1999 |
| EP | 1 136 508 A1 | 9/2001 |
| EP | 1 138 696 A1 | 10/2001 |
| EP | 1 138 697 A1 | 10/2001 |
| EP | 1 157 977 A1 | 11/2001 |
| GB | 370 878 A | 4/1932 |
| GB | 907 697 A | 10/1962 |
| JP | A 60-221354 | 11/1985 |
| JP | A-01-244808 | 9/1989 |
| JP | A 6-144900 | 5/1994 |
| JP | A 8-217519 | 8/1996 |
| JP | A 10-45451 | 2/1998 |
| JP | A 2000-264694 | 9/2000 |
| WO | WO 03/022773 AI | 3/2003 |

* cited by examiner

State of the Art

State of the Art

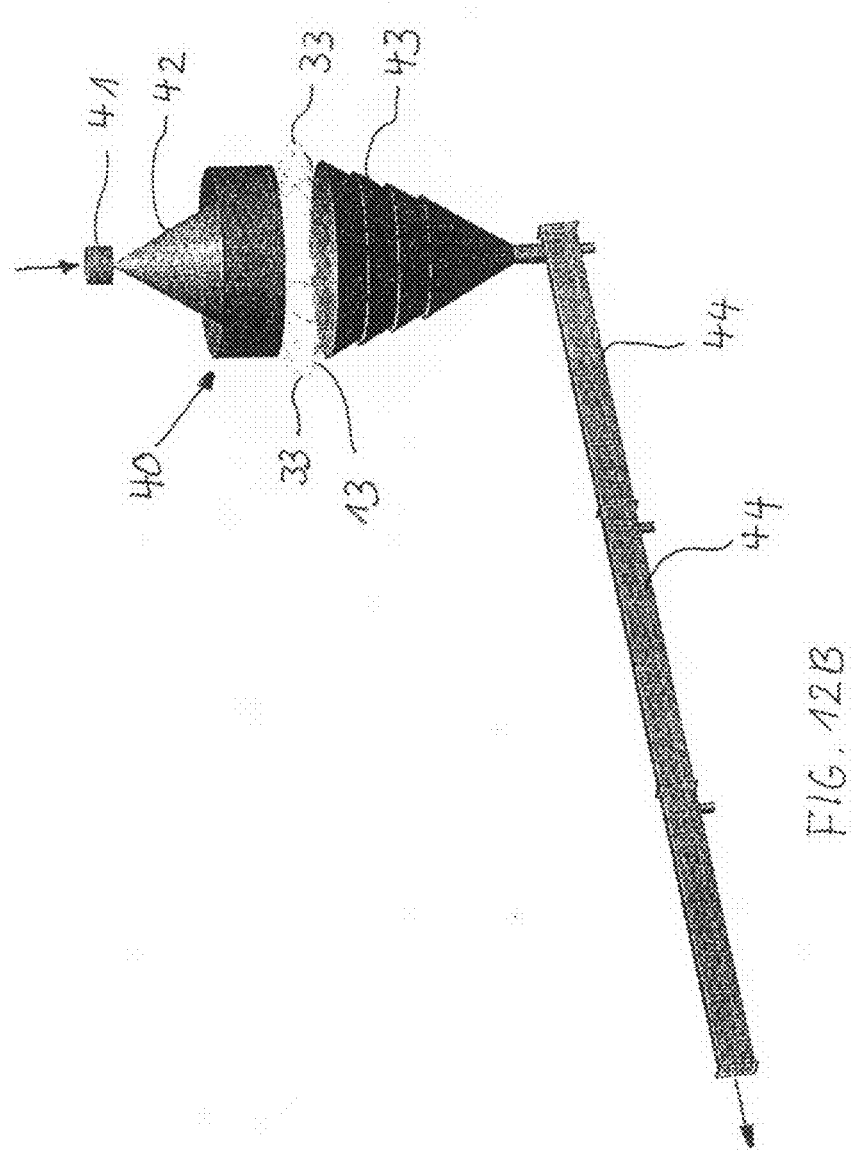

METHOD FOR PRODUCING A COATED BASIC MATERIAL FOR A HYDRAULIC COMPOSITION, COATED BASIC MATERIAL FOR A HYDRAULIC COMPOSITION, ADDITIVE FOR A HYDRAULIC COMPOSITION AND METHOD FOR PRODUCING A HYDRAULIC COMPOSITION

THE TECHNICAL DOMAIN

The present invention relates to a method for producing a coated basic material for a hydraulic composition in conjunction with the preamble of the first claim. The present invention relates furthermore to a coated basic material for a hydraulic composition, additives for a hydraulic composition and method for the production of a hydraulic composition in accordance with the preambles of the other independent claims.

THE STATE OF THE ART

Cement, a raw material, is, as a general rule, obtained from cement clinker. This process requires that cement clinker, which is the starting product issuing from the rotational cement kiln, be ground into pulverized cement and then mixed together with gypsum, which acts as a curing regulator, whereby cement results from the mixing process. The cement is stored in silos following manufacture. If the cement is to be further transformed into concrete, the raw material cement is comingled with additional materials and chemical. For example, the cement can be mixed together with water, stone and other additives inside a mechanical mixer, which is, for the most part, computer controlled. The addition of fluid or pulverous additives is aimed at improving the chemical and/or physical characteristics of the fresh and/or cured cement. Thus, for example, the additives are capable of influencing flow behaviour, viscosity and compression behaviour, as well as the curing behaviour of the concrete.

REPRESENTATION OF THE INVENTION

Competition in the field of chemical additives results in both improved and streamlined process technologies and in product improvements. Additionally, such competition should lead to the enhancement of concrete properties as well as further improvement in the workability of concrete.

The object of the present invention is, therefore, the creation of a method for producing a coated basic material for a hydraulic composition, a coated basic material for the production of concrete, an additive for the production of concrete and methods for the production of a hydraulic composition the result of which, being a simplified process technology and/or increased concrete quality.

It is proposed that these objectives be satisfied by means of the distinguishing features of the independent claims.

The essence of the invention is thus that prior to mixing of the hydraulic composition, the basic material is at least partially coated with an additive, more specifically, the additive is at least partially arranged on a basic material for the production of concrete.

One of the advantages of the invention is that the properties of the concrete can be significantly improved if, prior to the mixing of the individual concrete components, at least some of such individual components are coated.

This procedure can, for example, in the case of the particles of the basic material cement permit the physical and chemical properties to be modified prior to mixing and the chemical reaction with the other basic materials can be influenced during the mixing process. For example, a non-exhaustive list of additives whose names for the most part reflect their function are as follows: concrete fluidizers; flow agents; aerants; retardants; accelerants; stabilizers; chromatic reducers; embedding assisters; foamants; sealants; recycling assisters and corrosion inhibitors. If, for example, the cement prior to mixing with the other basic materials is coated with a concrete fluidizer, the ability of the coated cement to absorb water as compared to the untreated cement can be positively influenced.

It should be stressed from the outset that it is possible to coat all of the materials that are employed in the production of concrete. The particles can be most advantageously coated if the material particles are conveyed pneumatically and/or by gravity. This implies that the coating process need not necessarily take place while the concrete is being manufactured. The basic materials can therefore be pre-coated at the place of their production. Thus, for example, cement particles can be coated immediately following the cement production process.

Included in another subgroup of the basic materials can be materials or additives such as, for example, silica fume, fly ash, light aggregate, slag, foundry sand, fibrous materials, which can include organic materials such as polypropylene fibres etc. or inorganic fibres such as basalt, glass, etc. For example, fly ash, having different origins, possesses varying adsorption characteristics and thus, depending on the origin thereof, features a wide range of properties when added to concrete. If additives are used for coating, the characteristics are identical and more adapted to the environment so that varying material origins do not have to be taken into consideration.

Alternatively, or as a supplement to the coating of a subgroup of basic material, it can also be advantageous if, prior to mixing, particles belonging to two or more subgroups are coated with at least one additive. This procedure greatly strengthens the bond between the coated input materials and the cement paste. This has a positive effect on the resistance to de-icing salt, and the durability of the concrete. In addition, there results a positive influence on the rheology in respect of the rheological characteristics of the cement, which results in reduced mixing times and improved compatibility with the additives.

If the additive is sprayed by means of a nozzle and/or a mixer into the stream of the basic material, it is possible to achieve an especially homogeneous and uniform mixing of the particles. Use of the nozzles and/or mixers also ensure that, depending on the dimensions of the nozzle and mixer, it is possible to select a particularly high relative speed between coating agent and particle and thus raise the adsorption capacity of the coating agent. Listed by way of example are a number of suitable pneumatic nozzles and/or mechanical mixers; jet mixers with a Laval nozzle; jet mixer with a Venturi pipe; jet mixer with a propeller mixer; jet pump and various vortex mixers. An example of a mechanical mixer is the rotation mixer with screw and the drum mixer.

The additive can be sprayed into the stream of basic material either in the direction of flow and/or opposite to the direction of flow. If, for example, the spray angle can be varied, the collision speed and the relative speed of coating material and particles to be coated can be regulated.

It is useful if the additive is at least partly added in fluid form. For example, the fluid additive can be atomized (aerosol) and/or broken up into droplets (droplets) and/or converted into vapour (vapour). The thickness of the coat can be regulated by varying the consistency.

The fluid additive can be mixed together with a solvent, which is preferably water, and then added, whereby such solvent evaporates following addition.

The energy required for evaporation can be drawn from the cement or be supplied by other means. The injection spraying and the atomization of additives with air is particularly useful if the cement is to be transferred via a pneumatic transfer pipe into the mechanical mixer. If the fluid additive is to be sprayed into the material in the direction of material flow; as is the case in so-called jet washers, which are employed in the scrubbing of dust-laden waste gases, it is possible to nullify both the agglomeration effect of cement particles on additive droplets as well as the precipitation effect. The air in which the cement is transported can be controlled for temperature and moisture content. Temperatures in the region of 10° C. are sufficient to evaporate the solvent of the additive. This has the desired effect that the additive and the cement do not yet react since the water was drawn off with the pneumatic air that was used to transport the cement. The collision of additive droplets and cement particles results not only in the coating of the particles, but also the fine distribution of dust-like additives inside a pneumatic cement air transport pipe results in the homogeneous mixture of both chemical co-reactants. Particularly advantageous in this regard are air transport channels employing pneumatic gravimetric feed.

It has also been demonstrated that it is important to precisely plan for the amount of energy that will be required to evaporate the solvent or water. The temperature of the air used to transport the cement particles should be high enough to absorb the latent heat of evaporation and in any case any additional solvent heat from the fluid additive that may be present while preventing the transport air from becoming saturated and provoking vapour condensation (water steam condensation). The relative humidity of the air in which the cement particles are transported should be sufficiently low or regulated to such an extent that following absorption of the evaporated solvent, in particular, water, local oversaturation does not occur in the lower parts of the mixing apparatus or the transport conduit, which can lead to steam condensation. The heat required to evaporate the solvent, in particular, water, can be drawn from the cement since the latter exhibits sufficiently high excess temperature or appreciable heat.

The fluid additive can also be directly added in melted form in which case the melted material is added inside a mixer to the material to be coated, which involves such material being coated during the mixing process or, for example, the material to be coated is caused to pass through the melted material and stiffens after passing through the melted material. The thickness of the additive layer thus applied can be regulated by adjusting the various parameters such as passage time of the melted material, cooling rate, mixing time, etc.

Such an application process is particularly advantageous when used to coat fibres, which can be drawn through the melted material following which the fibres can be further treated after the additive has stiffened.

The additive can also be added, at least partly, in powdered form. This method permits the addition of additives that cannot be added in fluid form.

At least at the point of injection spraying, there should be produced a turbulent stream of basic material and/or of the sprayed-in additive.

The following are examples of additives that can be used: concrete fluidizers; flow agents (reaction); retardants; accelerants such as stiffening and hardening accelerants; stabilizers, aerants and/or sealants, all of which influence the chemical and/or physical characteristics during the reaction of the concrete components.

It is advantageous, if employed as an additive, that a high-performance concrete fluidizer such as, preferably, the product ViscoCrete® from the Sika® company. This high-performance concrete fluidizer reduces the water requirement of the cement and improves the workability of the concrete.

All basic materials that are used for the further processing of concrete can be employed as basic materials to be coated. As has been mentioned above, the proposed coating process is tied neither locally nor temporally to the concrete production process, an advantage that enables coating to be carried out at the place of production while the basic materials are being produced. For example, pneumatic nozzles and/or mechanical mixers installed inside the conveyance conduits or storage locations for the basic materials can facilitate adequate coating of the basic materials.

OVERVIEW OF THE DRAWINGS

Embodiments of the invention will next be described in greater detail with the aid of drawings. The same elements are referenced in the various figures with the same reference numerals. Both the flow direction and the flow speed of the media are indicated by means of arrows.

Figure 2:
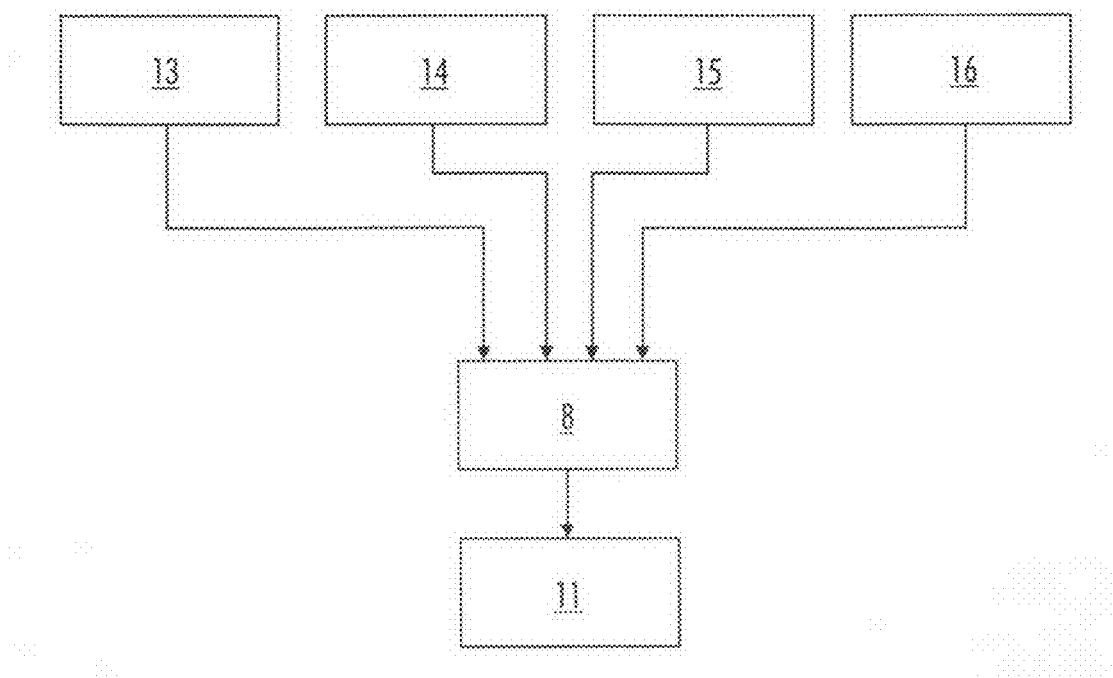
Figure 3:
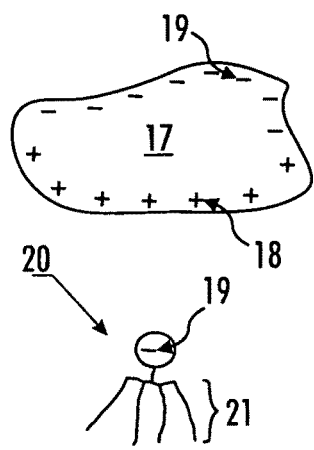
Figure 4:
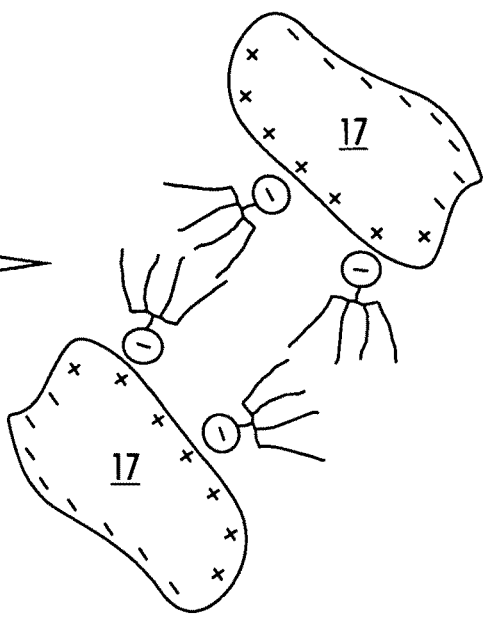
Figure 5:
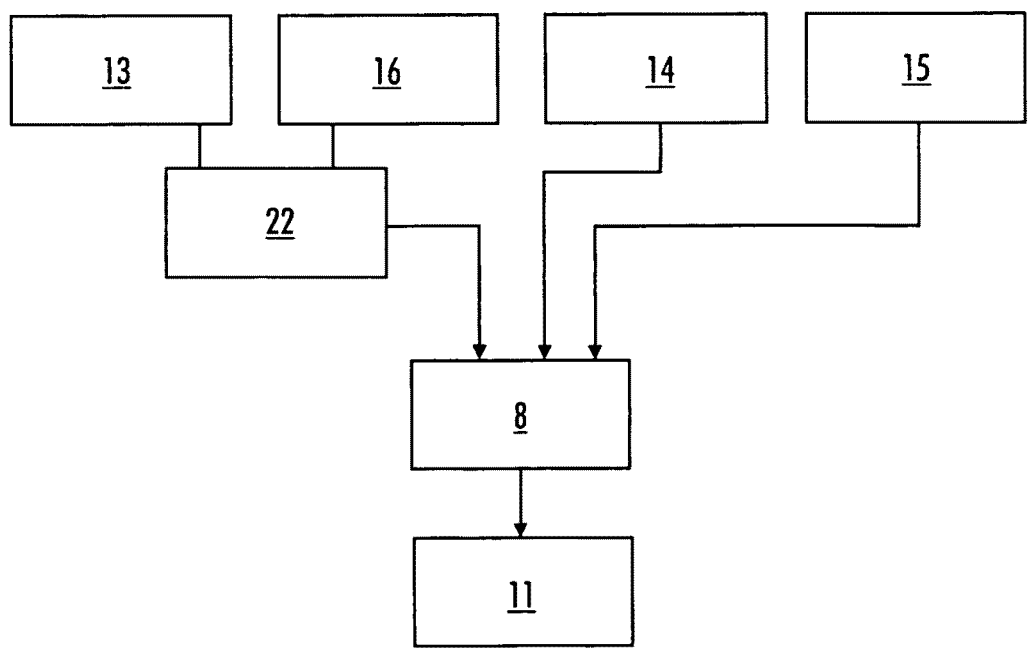
Figure 6:
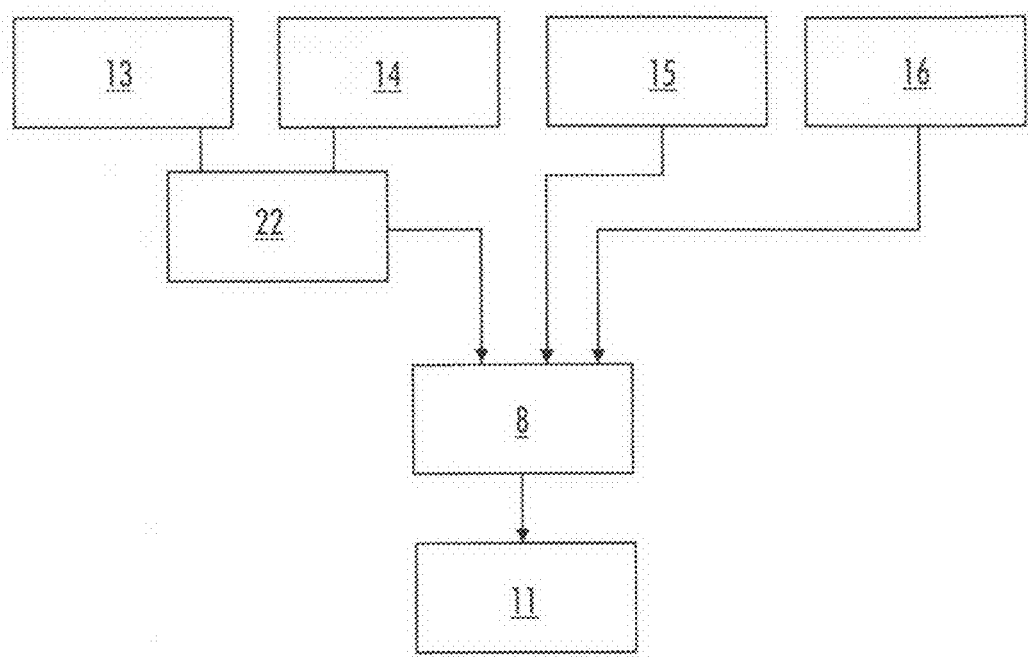
Figure 7:
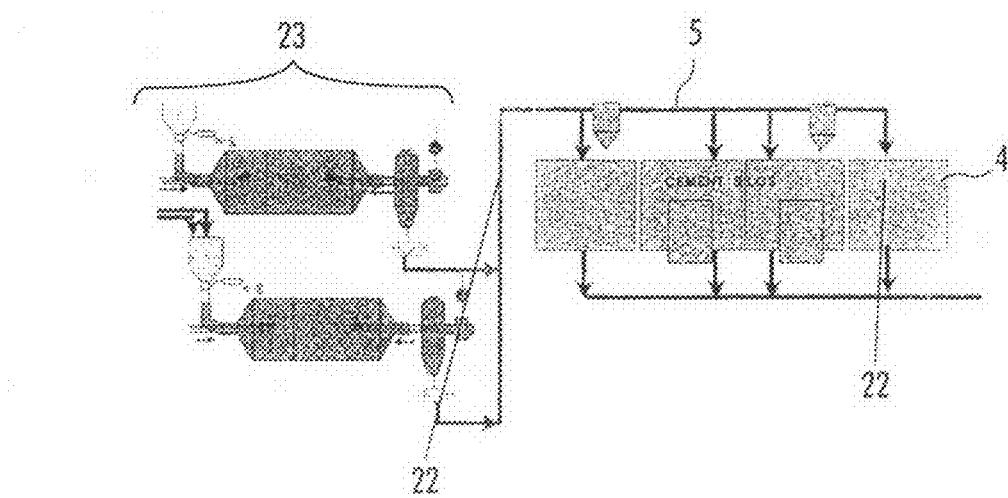
Figure 8:
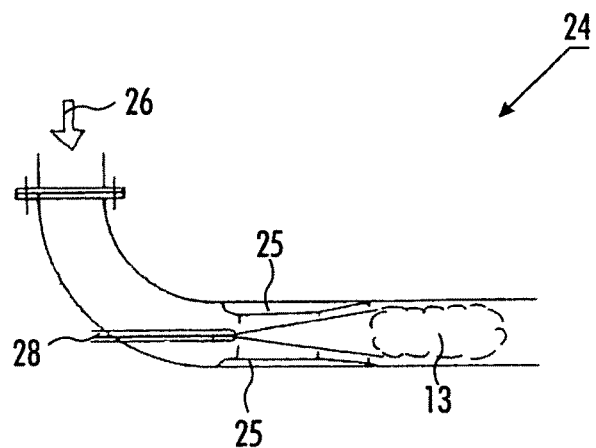
Figure 9:
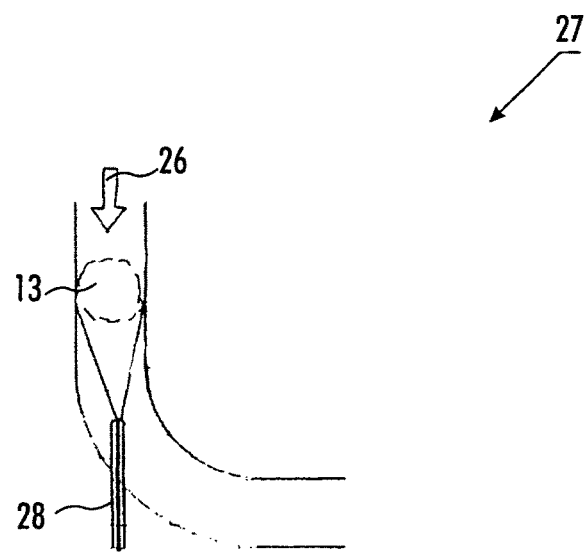
Figure 10:
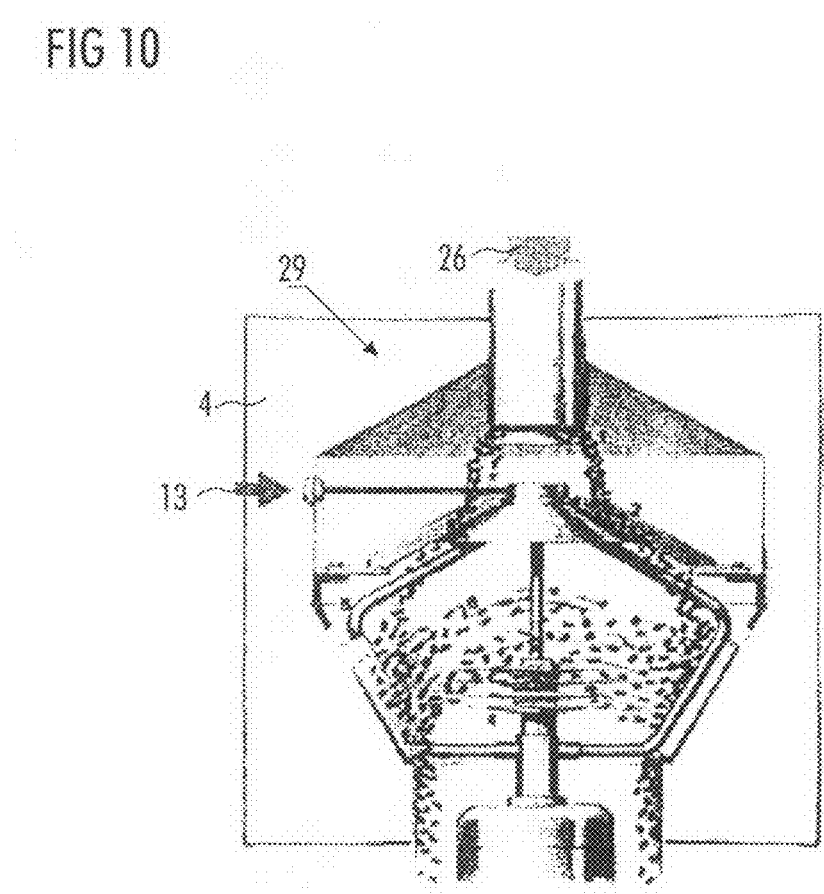
Figure 11:
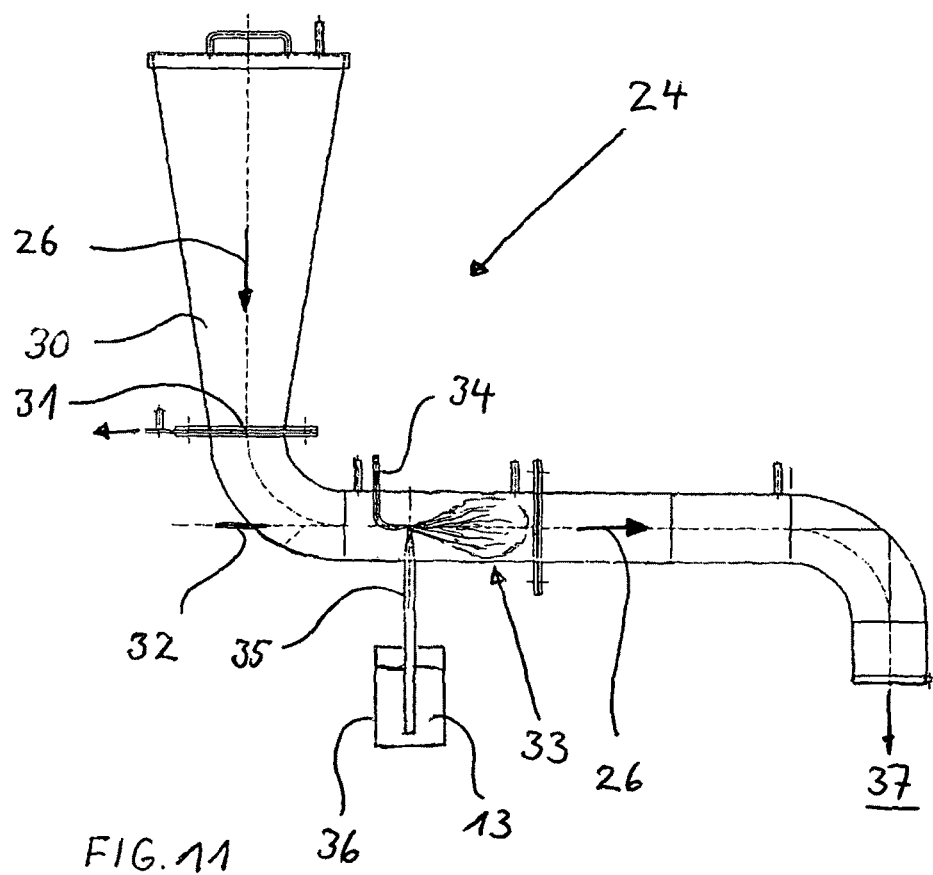
Figure 12A:
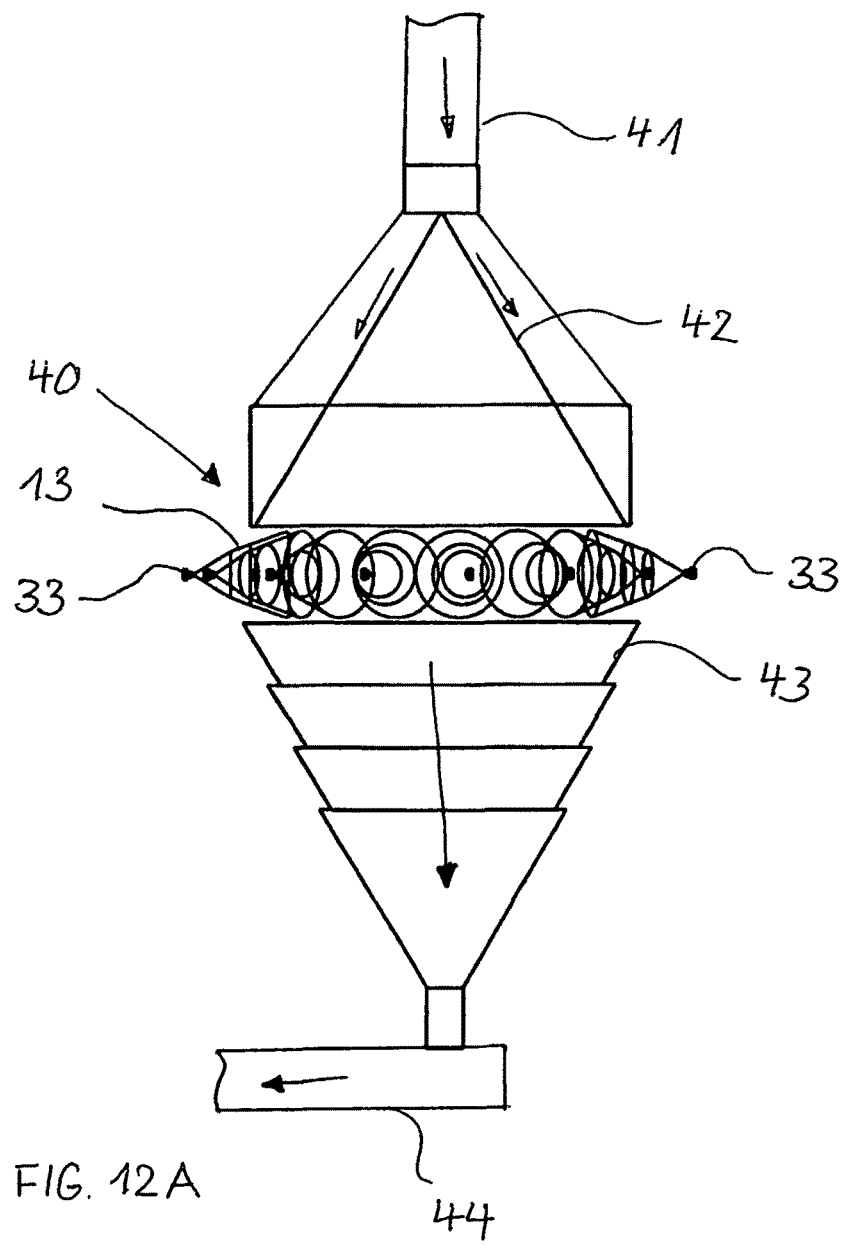
Figure 13A:
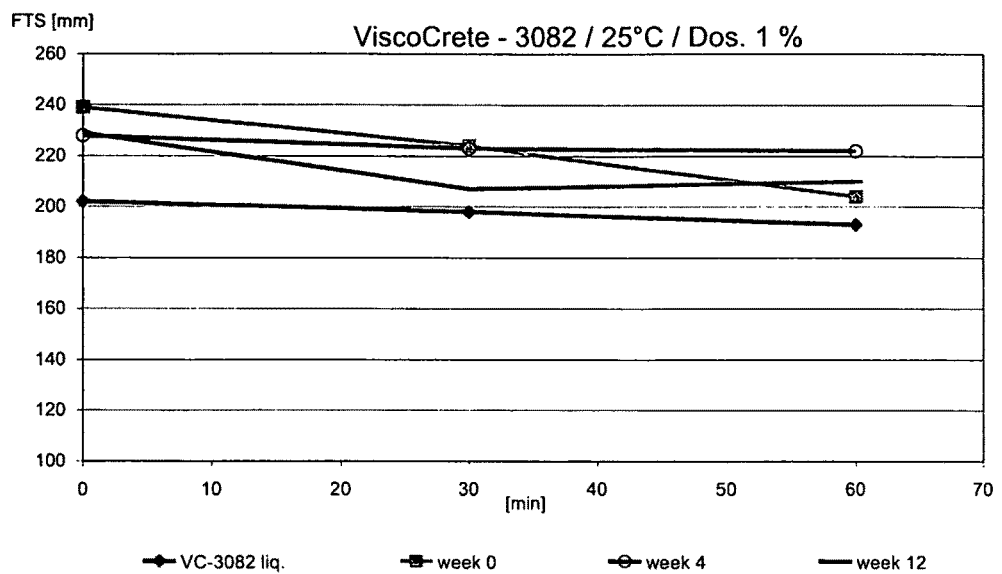
Figure 13B:
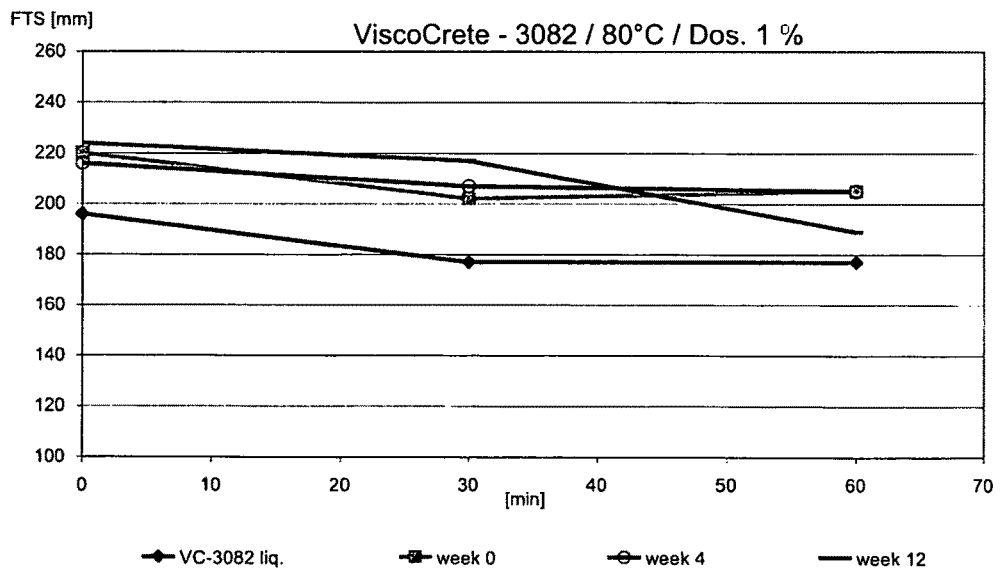
Figure 14:
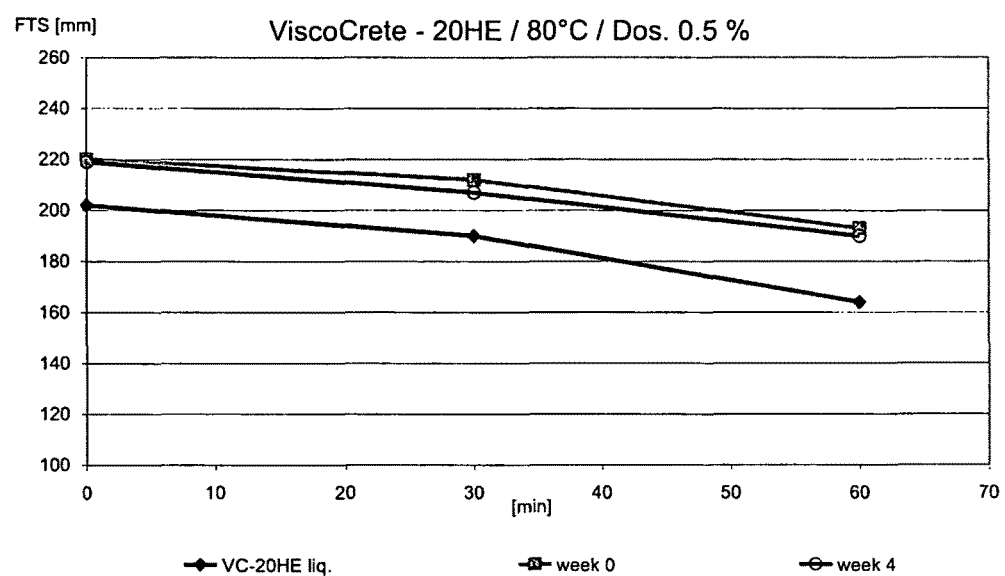
Figure 15:
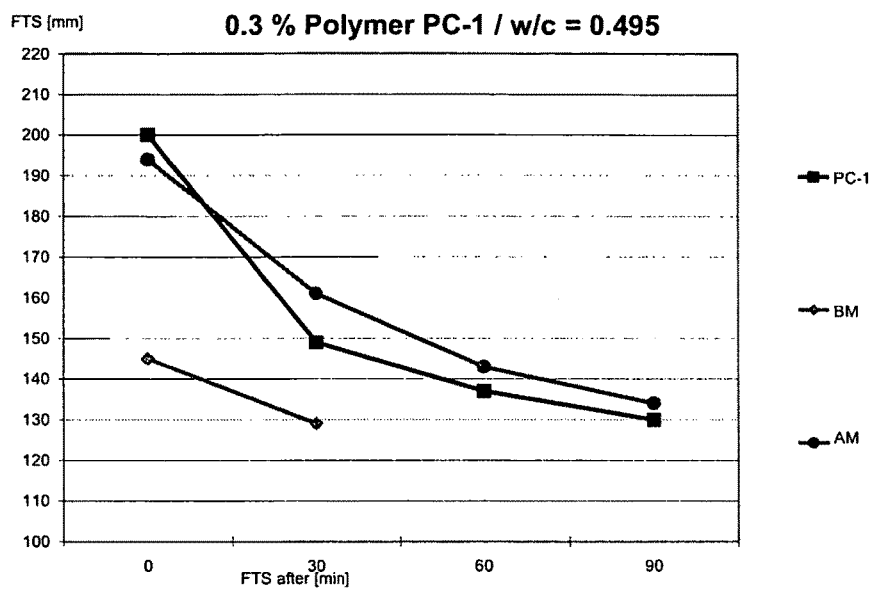
Figure 16:
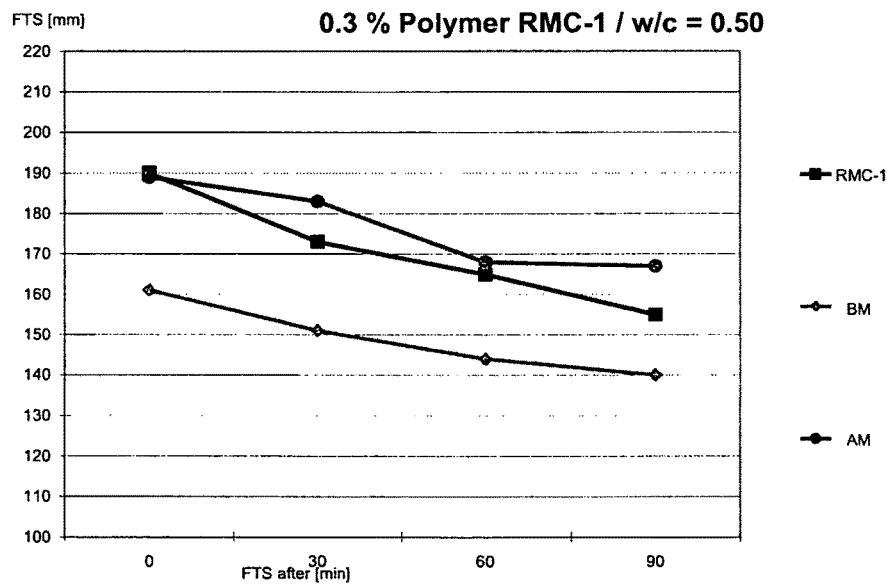

Shown are:

FIG. 1 Prior art concrete mixing process in a concrete plant;

FIG. 2 Schematic representation of the concrete mixing process;

FIG. 3 Cement particles and molecules of a concrete fluidizer prior to adsorption;

FIG. 4 Two cement particles with adsorbed concrete fluidizer molecules;

FIG. 5 Schematic representation of one embodiment of the proposed concrete mixing process;

FIG. 6 Further embodiments of the proposed concrete mixing process;

FIG. 7 A section through the system for producing cement as well as cement silos;

FIG. 8 Section through a uniflow mixer;

FIG. 9 Section through an opposite stream mixer;

FIG. 10 Section through a vortex mixer with rotational atomizer;

FIG. 11 Schematic representation of a proposed coating device;

FIG. 12A Schematic representation of a further proposed coating device;

FIG. 12B Representation of the further proposed coating device;

FIG. 13A A comparison of the durability of coating at 25° C. using the device in accordance with FIG. 11;

FIG. 13B A comparison of the durability of coating at 80° C. using the device in accordance with FIG. 11;

FIG. 14 A comparison of the durabilities of coating at 80° C. using the device in accordance with FIG. 11;

FIG. 15 Comparison of the durabilities of coating before and after milling;

FIG. 16 Comparison of the durabilities of coating before and after milling;

In the interest of clarity, only the essential elements of the invention have been shown.

EMBODIMENTS OF THE INVENTION

FIG. 1 shows the prior art concrete mixing process used in concrete production as conventionally implemented in concrete plant 1. Shown to the left in FIG. 1 is device 2 for the measured dispensing of stone. In this embodiment, this device comprises four funnel-shaped containers 3, each of which features at its lower opening region a conveyor belt 9 serving to transport the stone to mechanical mixer 8. The transport or running direction of conveyor belt 9 is indicated by means of arrows referenced with the reference numeral 10. Depending on the type of concrete to be produced, the sieve size of the stone is approximately between 0 mm and 16 mm in diameter. The stone can be sorted according to size and stored in the four containers 3. The cement, which constitutes the binding agent for the concrete, and which exhibits a particle size in the region of approximately 1 to 100 micrometers, is stored in cement silo 4. The cement is then also conveyed to the mechanical mixer 8 via conveying units 5, which, for example, can be motor-driven screw drives. A measured quantity of cement is waiting in container scale 6. Also located at mixer 8 the feed conduit 7 for water and additives, which can, for example, be concrete fluidizer, flow agent, aerants, retardant and similar agents, and which are added during the mixing process. Inside mechanical mixer 8, which is represented in this case as a continuous mixer with a horizontal stirring apparatus, the stone, water, cement and additive are added to a finished concrete mixture 11. Finished concrete 11 is conveyed via a conveyor belt 9 to transport vehicles 12.

In FIG. 2, the mixing process employed in the production of concrete is once more shown in schematic and simplified fashion. Shown in the upper portion of FIG. 2 are the four boxes representing the input components for concrete, namely additives 13, basic material 14, 16 which is subdivided into subgroups 14, e.g. sand and/or stone and/or etc. and subgroup 16, more particularly, the hydraulic binding agent, in this case, cement and water 15. The foregoing input components are blended together in a mechanical mixing process inside mixer 8 in order to produce prepared concrete mixture 11. The chemical and physical properties of the concrete mixture in such a mixing process are chiefly influenced by the proportions in which the concrete components are mixed together. It is proposed, that in accordance with the invention, through treatment of one or a plurality of concrete input components, prior to the mixing process, both the properties of such input components and the properties of the prepared concrete mixture 11 can be modified.

FIGS. 3 and 4 show the coating of particles at the molecular level.

Shown in the upper portion of FIG. 3 is a cement particle 17 approximately 0 to 100 micrometers in size. Cement particle 17 exhibits both positive 18 and negative charge carriers that are indicated by means of a "+" and a "−" (minus sign). Shown in the lower portion of FIG. 3 is a molecule of an additive, in this case, a concrete fluidizer and in this example a polycarboxylate molecule. The polycarboxylate molecule consists of a main chain with negative excess of charge and neutral side chains 21. If the concrete fluidizer with its molecules has already been added to the cement prior to the mixing process in mixer 8, then the cement, or, rather, its cement particle 17, can be coated on the surface.

In FIG. 4 the "effect" of concrete fluidization is shown in greater detail. The molecules 20 of the concrete fluidizer are adsorbed onto the surface of cement particle 17 due to the electrical attraction of the opposing charges + and − of the molecules. In this arrangement, the negative charge 19 of the main chain of molecule 20 is attracted to the positive charge 18 of the cement particle 17 and molecule 20 becomes completely bonded to a cement particle 17. The extended side chains 21 of the bonded molecules 20 act as spacers between the cement particle 17. This arrangement acts to prevent cement particle 17 from agglomerating or forming lumps.

Such prevention of reaction/binding of cement particle 17 one to another is known by the term "steric effect". Such surface coating of the cement particles and therefore also of the binding agent of the concrete, influences positively the consistency of the input materials for the concrete. The capacity of the concrete to absorb water is positively influenced by means of the coated cement, in addition, the overall workability of the concrete is improved.

Each of FIGS. 5 and 6 is a schematic representation, which more completely elucidate the novel method for producing cement with an integrated coating procedure. Shown in the upper portion of FIG. 5 are the four boxes representing the input components for the concrete, more particularly: additives 13; first basic material 14; second basic material 16; and water 15. In this practical application, additive 13, which, in this case, is a concrete fluidizer, for example, ViscoCrete® from the Sika® company. It will, of course, be appreciated that other types of additives, or a combination thereof, can be added such as those that have been described above.

In this embodiment, the first basic material 14 is stone. The second basic material 16, which is cement, acts as a binding agent for the concrete. Water 15 is an additional fluid component that is mixed with concrete fluidizer 13. These input components are mixed together in a mechanical mixing procedure inside mixer 8 to form prepared concrete mixture 11. This mixing process alone ensures that the chemical and physical properties of the concrete mixture will be influenced primarily by the mixing parameters and the ratios in which the materials are added to the mix. In the proposed process, cement 16 is coated with concrete fluidizer before the mechanical mixing procedure takes place inside mixer 8. This takes place in FIG. 5, under reference numeral 22, particle coating. Particle coating 22 comprises that fluid concrete fluidizer 13 be added to cement 16. Preferably, the fluid droplets of concrete fluidizer 13 should exhibit a high velocity relative to the cement particles 16. The high relative velocity enables collisions between the particles and an attendant surface coating of the cement 16, a process also described in FIGS. 3 and 4 and in the figure description appertaining thereto. It is advantageous if a turbulent particle flow were created, for example, by means of designing the pipe with a suitably shaped cross-section. For the injection spraying of the concrete fluidizer, for example, uniflow and counter-flow mixers can be employed.

Schematically illustrated in FIG. 6 is a further embodiment of the proposed concrete mixing process. In contrast to FIG. 5, the particles 22 of first basic material 14 of the concrete are coated. In this example, stone is being coated. Of course, other particles, such as especially aggregate such as e.g. silica fume, fly ash, light aggregate, slag, fibrous materials, which are to be added to the concrete, can be coated with an additive before the concrete is worked.

FIG. 7 shows a section of cement plant 23 and cement silos 4. Shown in the left hand region of the drawing is the area of the plant reserved for producing cement 23, wherein pulverized cement is milled together with gypsum. The newly-mixed cement is conveyed via conveyance units 5 to the four cement silos 4 shown in the right hand portion of the drawing and stored therein pending use. The conveyance of the cement is, as shown in FIG. 1, effected by means of conveyance units which may, for example, involve the transport of cement via conduits using compressed air. Indicated in FIG. 7 are two locations at which particle coating 22 of the cement can potentially take place. First of all, the objective of the invention is more readily attained if the cement is coated while transiting the conduits of the conveyance units 5. Further in this regard, FIGS. 8 and 9 illustrate examples of two possible mixing arrangements, each of which is shown in sectional view. As an alternative to, or as a supplement to this arrangement, particle coating 22 can take place inside cement silo 4. To illustrate this arrangement, FIG. 10 shows an example of a suitable mixer.

FIG. 8 shows a section through a uniflow mixer 24. Arrow 26 indicates the direction in which the cement particles flow through uniflow mixer 24. In this example, uniflow mixer 24 comprises an angled pipe section wherein cross-sectional constrictions 25 have been made inside the lower angled pipe section. Such cross-sectional constrictions 25 act to increase the velocity of the cement particles (continuity equation of hydrodynamics). In the region of cross-sectional constriction 25, concrete fluidizer 13 is sprayed through a nozzle 28 and mixed with the cement. In the region of the cross-sectional constriction, optimal swirling of the cement particles and of the particulate of concrete fluidizer 3 takes place. Nozzle 28 can be positioned at various angles relative to flow direction 26 of the cement particles.

FIG. 9 shows a section through counter-flow mixer 27. In contrast to uniflow mixer 24 of FIG. 8, nozzle 28 is arranged so as to spray material against the direction 26 in which the cement particles flow. The particles of concrete fluidizer 13 collide with the cement particles, which benefits optional surface coating of the cement particles.

FIG. 10 shows a sectional view of a vortex particle mixer 29 fitted with rotational atomizer inside a cement silo 4. Cement particles are introduced through the upper opening and arrow 26 indicates the direction in which the cement particles flow. Left-hand arrow 13 indicates the supply of additive, which can, for example, be a concrete fluidizer. The cement particles fall onto a product distribution cone and so are radially distributed and gravitationally precipitated downwardly. In this arrangement, the cement particles are sprayed with droplets of fluid that have been produced in a rotational atomizer.

It has been demonstrated that coating with additives of organic or inorganic fibres, especially of mineral fibres, can be accomplished if such fibres come into direct contact with the additive. Advantageously, this coating procedure involves causing the additive to enter a fluid phase and drawing the fibres through such fluid phase, or, alternatively, by applying such fluid phase to the fibres by means of rolling. The fluid phase can, for this purpose, be achieved by adding solvents, in particular water, or by melting the additive. Should melted additive be employed, the fibres used should exhibit suitable physical characteristics so that they do not sustain damage during the coating process, e.g. they do not melt. Mineral fibres, especially basalt fibres, have shown themselves to be advantageous when employed in such arrangements. Addition of such fibres to a hydraulic composition can, for example, influence the shrinkage, the stability and behaviour when exposed to heat, etc.

Embodiment Example

Basalt fibres, such as can be obtained from Basaltex, Belgium, were to be coated with a fluidizing agent. The basalt fibres exhibited an average diameter of between 12 and 15µ. The high-performance concrete fluidizer employed was ViscoCrete® from the Sika® company. Immediately after it had been produced, the fluidizer in fluid phase was transferred into a heated tub, an alternative to which would be melting the fluidizer inside the tub. Next, the basalt fibres were drawn through the molten mass present inside the tub. The fibres, now coated with fluidizer, were then allowed to cool down in air, and the coated fibres were then transferred to a cutting device to be cut into 6 mm, 12 mm or 25 mm lengths. The coat can also be cooled down inside a cooling chamber, which greatly reduces the cooling-down period. The fibre sections were then added to a conventional concrete mixture comprising Portland cement, whereby the separation of the fluidizer from the surface of the fibres produced a fluidized concrete, which lent itself formidably to working. The coated fibres became very homogeneously distributed throughout the concrete mixture, without the formation of fibre bundles. This type of cement is eminently suited for use in large-surface flatwork, since on the one hand, the fluidization has made the concrete highly susceptible to flowing while on the other, the presence of the fibres ensures that practically no shrinkage will result.

High-performance concrete fluidizers and flow agents such as the product ViscoCrete® can comprise polycarboxylates. By polycarboxylates is meant comb-shaped polymers, which are formed from a main chain, to which are attached carbonic acid groups in the form of free acids or the salts thereof, and side chains comprising polyalkyleneoxide. Such polycarboxylates are known in the art, e.g. from EP1 136 508 A1, EP1 138 696 H1 and EP1 138 697 A1 owned by the applicant. The composition of the polycarboxylate is included hereunder. The polyalkylene oxide or polyalkylene side chains can be bonded to the main chain via ester bonds, amide bonds, or ether bonds. In addition to the carbonic acid groups and the polyalkylene oxide side chains, further functional or non-functional groups can be bonded to the main chain. Such comb-shaped polymers can be produced, for example, by means of copolymerization of unsaturated mono or di-carbonic acids with unsaturated carbonizacid esters, unsaturated carbonic acid amides, allyl ethers or vinyl ethers. The carbonic acids present in the comb-shaped polymers so produced may be present in the form of the free acids through or wholly or partially in the form of the salts thereof. The comb-shaped polymers can also be produced by means of polymer-analogous reactions. In such reactions, a polymer, comprising either latent or free carboxlyl groups, is reacted with one or more compounds comprising amine or hydroxyl functions under conditions that promote the partial amidization or, as the case may be, esterization of the carboxyl groups. The polyalkylene glycol of the side chain is based on polymerized epoxide—containing compounds, such as, for example, ethylene oxide, propylene oxide, 1-butylene oxide, phenyl-ethylene oxide, etc. It is preferred that the polyether side chain comprise polyethylene oxide or polypropylene oxide or a mixed copolymer comprising ethylene oxide and propylene oxide and has at its free end a hydroxyl group, a primary amino group or an alkyl group having between 1 and 20 carbon atoms, being straight-chain, branched or cyclical, preferably a straight chain alkyl group having between 1 and 4 carbon atoms. Such polycarboxylates have a molecular weight of between 5,000 and 200,000, preferably between 8,000 and 100,000, most preferably a molecular weight of between 10,000 and 80,000. The carbonic acid salts can be alkali metals or alkaline earth metals or salts of other two or three valence electron metal ions, an ammonia ions, organic ammonia groups or mixtures.

In one embodiment, the proposed polycarboxylate comprises four structural units (a, b, c and d) and has the structural form A.

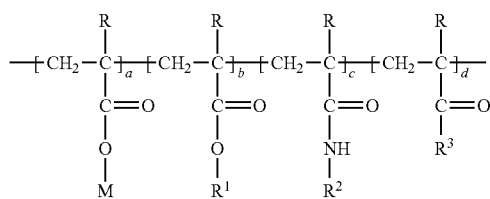

Wherein:
M=hydrogen, alkali metal ion, alkaline earth metal ion, two or three valence electron metal ion, an ammonia ion, an ammonia group or mixtures thereof;
R=each R independent of the other hydrogen or methyl;
$R^1$ and $R^2$=$C_1$ to $C_{20}$ alkyl, cycloalkyl, or alkyl aryl,
—[A0]$_n$—R4,
wherein A=$C_2$ to $C_4$ alkylene, R4=$C_1$ to $C_{20}$ alkyl, cyclohexyl, or alkyl aryl, and n=2-250, preferably n=8-200, more preferably n=11-150, most preferably n=11-100;
$R^3$=—$NH_2$, —$NR^5R^6$, —$OR^7NR^8R^9$,
wherein $R^5$ and $R^6$ independently of each other is a $C_1$ to $C_{20}$ alkyl-, cycloalkyl-1 or alkyl aryl or aryl group or a hydroxyalkyl group, such as, for example, hydroxyethyl, hydroxypropyl-, hydroxybutyl group, or an acetoxyethyl —($CH_3$—CO—O—$CH_2$—$CH_2$—), hydroxyisopropyl —(HO—CH($CH_3$)—$CH_2$—), acetoxyisopropyl group ($CH_3$—CO—O—CH ($CH_3$)—$CH_2$—),
or $R^5$ and $R^6$ together form a ring, whereof nitrogen forms a part, in order to constitute a morpholine or imidazoline ring,
wherein $R^7$ is a $C_2$-$C_4$ alkylene group and $R^8$ and $R^9$, independently of each other, is a $C_1$ to $C_{20}$ alkyl-, cycloalkyl-,
M=hydrogen, alkali metal ion, alkaline earth metal ion, two or three valence electron metal ion, an ammonia ion, an ammonia group or mixtures thereof;
alkyl aryl- or an aryl group or a hydroxyalkyl group such as, for example, hydroxyethyl-, hydroxypropyl-, or a hydroxy-butyl group,
a/b/c/d=(0.1-0.9)/(0.1-0.9)/(0-0.8)/(0-0.3),
preferred (0.1-0.9)/(0.1-0.9)/(0-0.5)/(0-0.1),
more preferred (0.1-0.9)/(0.1-0.9)/(0-0.3)/(0-0.06),
even more preferred (0.2-0.8)/(0.199-0.799)/(0.001-0.09)/(0-0.06),
especially preferred (0.2-0.8)/(0.19-0.79)/(0-0.1)/(0.01-0.3),
and a+b+c+d=1.

The arrangement sequence of building blocks a, b, c, d can be by blocks, alternating or random. Polycarboxylate in accordance with Formula A can be imagined as comprising a main chain of polymerized units of acrylic acid and methacrylic acid or a mixed copolymer thereof. The polyalkylene oxide side chains are bonded to the main chain by means of ester or amide groups. Besides the carbonic acid groups, or, rather carbonic acid salts on the polyalkylene side chains, other groups can be bonded to the main chain via ester or amide bonds, such as, for example, alkyl groups, cycloalkyl groups, aromatic compounds, substituted aromatic compounds, hydroxy-alkyl groups, dialkylamino alkyl groups, or heterocyclic rings, wherein the N of the amide group is a component, such as, for example, morpholine or 1-midazole.

Examples of $R^3$ groups that are bonded to the main chain via their N which is in form of an amide are amine radicals that comprise one or two aliphatic, cycloaliphatic or aromatic radicals of 1 to 20 carbon atoms such as, for example, methyl-, ethyl-, propyl-, iso-propyl, -butyl-, iso-butyl or cyclohexyl radicals that are independent of each other. Examples of such amine radicals are di-butyl amine or di-cyclohexamine. Further examples are amine radicals with hydroxyalkyl groups such as ethano amine or di-ethanol amine. Examples of $R^3$ groups that are bonded to the main chain via their O as esters are aliphatic, cycloaliphatic or aromatic radicals containing from 1-20 carbon atoms, such as, for example: methyl-, ethyl-, propyl-, iso-propyl-, butyl-, iso-butyl-, or cyclohexyl radicals. Other examples thereof are amino-alcohol radicals such as methyl-diethanolamine, tri-isopropazolamine, triethanolamine, dibutylamino-ethanol, diisopropanolamine, diethylamino-ethanol, dimethylamino-ethanol.

Shown in FIG. 11 is another uniflow mixer 24. The direction in which the cement particles flow through uniflow mixer 24 is indicated by arrow 26. The material to be coated is loaded into a funnel 30 and is retained inside such funnel by means of a sliding element 31. Connecting to such funnel is an angled pipe section fitted with a nozzle 32, through which compressed air can be sprayed into the pipe section. Arranged in the pipe section connecting thereto is a Prandtl-nozzle 33 with nozzle for compressed air 34 and suction tube 35. Such suction tube extends into a container 36 containing coating material, in this case, concrete fluidizer 13, which is to be mixed into the material to be coated. Compressed air is blown through nozzle 34 into the pipe whereby negative pressure is produced inside suction tube 35, through which fluidizer 13 is suctioned and atomized. Nozzles 32, 33 can be arranged at various angles relative to the flow direction 26 of the cement particles. After the material to be coated, in this case, cement, is loaded into the funnel, compressed air is blown through nozzles 32 and 34 into the pipe. Next, sliding element 31 is opened, the cement flows through the pipe and is coated with atomized fluidizer 13. Next, the now-coated cement is transferred to a receptacle 37, which is not illustrated in greater detail. For the purposes of industrial production, the coating process would, of course, be continuous, in which case the material to be coated would be continually conveyed, an arrangement wherein funnel and sliding element would be obviated.

It is not necessary for the functioning of this device for it to have pipes, but it can be readily employed in conduits having other cross sections, in particular rectangular cross sections. Such conveyance conduits having rectangular cross sections are employed in cement production, otherwise referred to as air transfer channels or "air slides" or "fluid slides", these serve to transport material pneumatically and gravitationally. The cement can be directly coated inside such channels. This arrangement is especially advantageous if coating is to be done immediately prior to loading onto a means of transport such as, e.g. a truck. This arrangement permits individual transport means to be loaded with material having a particular type of coating. Of course, the type of coating process illustrated in FIG. 11 and described above can also be implemented in counter-flow mode as suggested in FIG. 9.

Shown in FIGS. 12A and 12B is a further proposed coating device 40. The direction in which the material to be coated, in particular, cement particles, flows through coating device 40, is indicated by means of arrows. The material to be coated is transferred via a transfer line 41 into a widening funnel 42, whence it falls freely in the shape of an annulus into a collecting funnel. The material to be coated is coated during free-fall by additive that is applied via nozzles, in particular Prandtl nozzles 33. The nozzles are advantageously disposed on the outside, but can be arranged on the inside or be arranged both on the inside and the outside. The nozzles 33 can be arranged at different angles relative to the direction in which the particles to be coated are falling. Through the appropriate positioning of the nozzles, the coating procedure can be adapted to the type of material to be coated. Although the Prandtl-nozzle 33 is not shown in detail, the functioning thereof is analogous to that of FIG. 11. By using the widening funnel to widen the stream of particles to be coated and by selecting suitable angular positions for nozzles 33, it is possible to achieve uniform particle coverage. Collecting funnel 43 can, as indicated, comprise a plurality of nested funnels, an arrangement that causes the material to be coated to be thoroughly mixed up by whirling action, which increases the quality of the coating. The coated material can than be loaded directly from collecting funnel 43 into a transport container, e.g. onto a truck or, as illustrated, via a conveyance device to further transport. The conveyance device need not necessarily feature pipes, but can be advantageously configured as air conveyance channels, in which conveyance takes place both pneumatically and gravitationally.

Shown in FIGS. 13 to 16, are rates of spread for the Portland cement that was coated with the aid of the device illustrated in FIG. 11 as compared to conventional methods for infusing additives. In each case, coating was carried out in air pressurized to 6 Bar and 10 kg of material were coated. Transit time for material through the device was ca. 40 sec. The spreading rate was determined in accordance with DIN EN 196-1.

In FIG. 13A are shown the measurement results for the rate of spread of Portland cement coated with Sika® ViscoCrete® 3082 at 25° C. with a dosage of 1% as related to the weight of the binding agent. This was compared with the results obtained from adding ViscoCrete in fluid form (see curve VC-3082 liq.). The measurements of the rate of spread were carried out immediately following coating (week 0), as well as at 4 weeks (week 4) and 12 weeks (week 12) following coating. It is clearly apparent that the liquefying effect of the same added quantity of ViscoCrete when coating the cement particles is far superior to that obtained by direct addition of the material. Use of the coated cement particles even after 12 weeks permitted achievement of superior values, than was the case with direct addition. Furthermore, the coat proved itself to be stable.

Shown in FIG. 13B are the measurement results of a Portland cement coated with Sika® ViscoCrete® 3082 at 80° C. with a dosage of 1% as related to the binding agent weight. This was compared to the results of adding fluid ViscoCrete (curve VC-3082 liq.). Even in this case, it is evident that the fluidizing effect of the same dosage quantity of ViscoCrete in coating the cement particles is markedly superior to that achieved by direct addition. Even after 12 weeks, employment of the coated cement particles produces superior results than those achieved by direct addition. Even the long-term values are slightly better than those achieved with coating at lower temperatures, which can be explained thusly: at higher temperatures, any water present in the concrete is evaporated, which renders the coat more stable over extended periods of time.

Shown in FIG. 14 are the measurement results of a Portland cement that has been coated with Sika® ViscoCrete® 20HE at 80° C. with a 0.5% dosage relative to the weight of the binding agent. This was compared to the results of adding fluid ViscoCrete (curve VC-20HE liq.). Even in this case, it is evident that the fluidizing effect of the same dosage quantity of ViscoCrete following coating of the cement particles is markedly superior than that achieved by direct addition. Even after 12 weeks, employment of the coated cement particles produced better values than were achieved by direct addition. Even after 4 weeks, employment of the coated cement particles yields practically the same values as those obtained immediately following coating and markedly better values than those obtained by direct addition.

Shown in FIG. 15 are the measurement results of a Portland cement that has been coated with a fluidizer PC-1 of polycarboxylate with a 0.3% dosage relative to the weight of the binding agent (curve AM) as compared to the results of the direct addition of the polymer (curve PC-1). Even in this case, it is evident that the fluidizing effect of the same dosage quantity of fluidizer used to coat the cement particles is superior to that achieved by direct addition. In the case of addition of material prior to cement milling, the values mere markedly superior. The polymers that were added prior to the cement mill are evidently at least partly destroyed during the milling procedure. The fluidized PC-1 used in this case comprises essentially a polymer in accordance with the aforementioned structural formula A, wherein:

$M=H$— and/or Na
$R=H$—
$R^1$=Mixture of $CH_3$-PEG1000- and $CH_3$PEG3000- in a mol ratio of 50:50
$R^3=HO—CH_2CH_2—NH—$
a/b/c/d=0.75/0.20/0.00/0.05
Molecular weight=26,000

Shown in FIG. 16 are the measurement results of a Portland cement that has been coated with another RMC-1 polymer comprising substantially polycar at a 0.3% dosage relative to the weight of the binding agent (curve AM) as compared to the results of the addition of fluid polymer (curve PC-1). Even in this case, it is evident that the fluidizing effect of the same dosage quantity of fluidizer used to coat the cement particles is superior to that achieved by direct addition. In addition, the polymer RMC-1 was added prior to the milling of the cement (Curve BM). Even in this case, it was demonstrated that fluidizing effect of the same dosage quantity of fluidizer to coat the cement particles is superior to that achieved with direct addition and that introduction of additive prior to cement milling yielded significantly poorer values. The fluidizer employed in this case, RMC-1, comprises essentially a polymer in accordance with structural formula A wherein:

$M=H$— and/or Na
$R=CH_3$—
$R^1=CH_3$-PEG1100-
a/b/c/d=0.50/0.50/0.00/0.00
Molecular weight=18,000

The present invention also contemplates the application of corrosion inhibitors on the materials to be coated. Such corrosion inhibitors are known in the art, for example, from EP0 635 463 A1, EP0 941 975 A1 and EP0 957 071 A1. The corrosion inhibitors disclosed in the aforementioned patents can be employed in accordance with the novel process described in these presents to coat materials, in particular cement. For coating purposes, the corrosion inhibitors are advantageously produced during the coating procedure itself in that the at least partially terminated acid/base reaction of amino compounds and acids takes place during such procedure. For this purpose, both substances are sprayed together into the mixture, the result of which being the formation of an aerosol mist in which the desired salts and compounds are formed. The coating is accomplished in this case with the aid of the devices illustrated in this figure. Use of this method results in a markedly superior coat. It is also possible, however, for the corrosion inhibitors to be added directly, and in any case together with a solvent.

It is advantageous for the purposes of the present invention that the products of the at least partially completed acid/base reactions of amino compounds and acids be employed as corrosion inhibitors. Such corrosion inhibitors can be an amino compound or mixtures of amino compounds, which, depending on requirements, are neutralized by means of an acid or a plurality of acids. Suitable amino compounds and/or amino alcohols are primary and/or secondary and/or tertiary amines, wherein aliphatic and/or aromatic and/or cycloaliphatic radicals are bonded to the nitrogen atom or wherein the nitrogen atom of the amino compound represents part of a heterocyclic structure and whereby one or a plurality of amino groups are present in the amino compound of the corrosion inhibitor. Also suitable are amino alcohols such as primary, secondary or tertiary aliphatic amines that comprise at least one alkanol amine grouping per molecule. Especially suitable amino compounds, in particular, amino alcohols, are selected from a group that comprises the following amines:

cyclohexylamine
dicyclohexylamine
N-methyl-cyclohexylamine
N,N-dimethyl-cyclohexylamine
N-benzyl-dimethylamine
hexamethylentetramine
triethylentetramine
diethylentriamine
ethylendiamine
N,N-dimethylethanolamine
N-methyl-diethanolamine
mono-, di-, tri-ethanolamine
piperazine
morpholine
guanidine.

Preferred amino compounds are N,N-Dimethyl ethanolamine, N-methyldiethanolamine as well as mono, di and tri-ethanolamine. Acids suitable for partial neutralization by means of the acid/base reaction are monobasic or multibasic inorganic or organic acids, in particular those acids that in and of themselves produce a corrosion-reducing effect and/or possess the capacity to have a concrete fluidizing effect. Especially suitable acids are those, which, in the pressure of calcium ions, form barely soluble or insoluble compounds or complexes or chelates. The following are especially suitable acids:

phosphoric acid
pyrophosphoric acid
phosphonic acid
benzoic acid
capronic acid
caprylic acid
oenanthic acid xxx
amino benzoic acid
sulfanilic acid
salicylic acid
sebacic acid
oelic acid xxx
linolic acid
adipinic acid
tetrahydroxiadipinic acid
lactic acid
tartaric acid
citric acid
gluconic acid
glucoheptonic acid
heptonic acid and
ascorbic acid.

Preferred acids are phosphonic acids, benzoic acid, lactic acid, Glucomic acid, glucoheptonic acid, oenanthic acid, and caprylic acid. The concentration of the amino compound or of the hydroxiamino compound ranges normally between 0.2% by weight to 2% by weight, preferably approx. 0.6% by weight relative to the weight of the injected cement. Neither the amines nor their saline products with acids degrade the stability of the coated materials or the curing behaviour thereof, more specifically, the ultimate stability of the hydraulic composition.

In sum, the present invention offers a method for producing concrete and a device serving the implementation of such method, wherewith concrete quality can be improved.

It will doubtless be appreciated that the above-described distinguishing features of the present invention can have application not only in the individual combinations elucidated above, but also in other combinations or severally, without breaching the intent or spirit of the invention.

| | List of reference captions: |
|---|---|
| 1. | Concrete plant |
| 2. | Device for dispensing stone |
| 3. | Container for stone |
| 4. | Silo for cement |
| 5. | Conveyance unit |
| 6. | Container weight scale with cellular wheel sluice |
| 7. | Feed of water and concrete fluidizer |
| 8. | Mechanical mixer |
| 9. | Conveyor belt |
| 10. | Travel direction of conveyor belt |
| 11. | Prepared concrete mixture |
| 12. | Transport vehicle |
| 13. | Additive/concrete fluidizer |
| 14. | First basic material/stone |
| 15. | Water |
| 16. | Second basic material/stone |
| 17. | Cement particle |
| 18. | Positive charge |
| 19. | Negative charge |
| 20. | Molecule of the concrete fluidizer |
| 21. | Side chain of the molecule |
| 22. | Particle coating |
| 23. | Part of plant cement |
| 24. | Uniflow mixer |
| 25. | Cross-sectional constriction |
| 26. | Flow direction of cement particles |
| 27. | Counter-flow mixer |
| 28. | Nozzle |
| 29. | Vortex mixer with rotational atomizer |
| 30. | Funnel |
| 31. | Sliding element |
| 32. | Nozzle |
| 33. | Prandtl-nozzle |
| 34. | Nozzle |
| 35. | Suction pipe |
| 36. | Container |
| 37. | Receptacle |
| 40. | Coating device |
| 41. | Feed conduit |
| 42. | Widening funnel |
| 43. | Collecting funnel |
| 44. | Conveyance channels |

The invention claimed is:

1. A method for producing a coated basic material for a hydraulic composition, the basic material comprising at least one hydraulic binding agent and particles belonging to at least one of a plurality of subgroups, the method comprising:
   at least partially coating the basic material with a concrete fluidizer without previously or simultaneously mixing the basic material with water in a hydraulic composition, and at least partially coating the basic material with an additive selected from the group consisting of a flow agent, a retardant, an accelerant, a stabilizer, an aerant, a sealant, and a corrosion inhibitor, wherein the concrete fluidizer is a polycarboxylate having a structural formula A

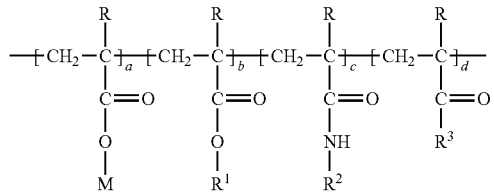

wherein:

M=hydrogen, an alkali metal ion, an alkaline earth metal ion, a two or three valence electron metal ion, an ammonia ion, an organic ammonia group or a mixture thereof, R=each R is methyl-, $R^1$ $R^2$=$C_1$ to $C_{20}$ alkyl, cycloalkyl, or alkyl aryl, —[AO]n—R4, wherein A=$C_2$ to $C_4$, alkylene, R4=$C_1$ to $C_{20}$ alkyl, cyclohexyl, or alkyl aryl, and n=2-250, $R^3$=—$NH_2$, —$NR^5R^6$, or —$OR^7NR^8R^9$, wherein $R^5$ and $R^6$ independently of each other are each a $C_1$ to $C_{20}$ alkyl-, cycloalkyl-, or alkyl aryl or aryl group or a hydroxyalkyl group, or an acetoxyethyl —($CH_3$—CO—O—$CH_2$—$CH_2$—), hydroxyisopropyl —(HO—CH($CH_3$)—$CH_2$—), acetoxyisopropyl group ($CH_3$—CO—O—CH($CH_3$)—$CH_2$—), or $R^5$ and $R^6$ together form a ring, whereof nitrogen forms a part, in order to constitute a morpholine or imidazoline ring, wherein $R^7$ is a $C_2$-$C_4$ alkylene group and $R^8$ and $R^9$ independently of each other are each a $C_1$ to $C_{20}$ alkyl-, cycloalkyl-, alkyl aryl- or an aryl group or a hydroxyalkyl group, a/b/c/d=(0.1-0.9)/(0.1-0.9)/(0-0.8)/(0-0.3), and a+b+c+d=1.

2. The method in accordance with claim 1, wherein at least one of the hydraulic binding agent and the particles belonging to at least one of a plurality of subgroups is coated with the concrete fluidizer.

3. The method in accordance with claim 1, wherein at least one of sand and stone is employed as a said subgroup of the basic material.

4. The method in accordance with claim 1, wherein the particles belonging to a subgroup comprise at least one member selected from the group consisting of silica fume, fly ash, light aggregate, slag, foundry sand, and fibers.

5. The method in accordance with claim 1, wherein in order to coat the basic material, the concrete fluidizer is sprayed by means of at least one of a nozzle and a mixer into a stream of the basic material.

6. The method in accordance with claim 5, wherein the concrete fluidizer is sprayed in a flow direction of the basic material or against the flow direction of the basic material.

7. The method in accordance with claim 1, wherein the concrete fluidizer is coated on the basic material at least partly in liquid form.

8. The method in accordance with claim 7, wherein the concrete fluidizer coated on the basic material is in at least one form selected from the group consisting of atomized (aerosol), broken up into droplets (droplets), and evaporated (vapor).

9. The method in accordance with claim 7, wherein the concrete fluidizer is mixed together with a solvent before being sprayed into a stream of the basic material, and the solvent evaporates after the concrete fluidizer is sprayed into the stream.

10. The method in accordance with claim 9, further comprising transporting the basic material in the stream with a transport air, and adjusting at least one of temperature and relative air humidity of the transport air so that the transport air does not become saturated after the solvent evaporates.

11. The method in accordance with claim 9, wherein energy for evaporating the solvent is drawn from the basic material to be coated.

12. The method in accordance with claim 1, wherein the concrete fluidizer is coated on the basic material at least partly in powder form.

13. The method in accordance with claim 1, wherein the basic material is conveyed pneumatically in a stream to which the concrete fluidizer is added.

14. The method in accordance with claim 5, wherein a turbulent flow of at least one of the basic material and the concrete fluidizer is produced at a point where the concrete fluidizer is sprayed into the stream.

15. The method in accordance with claim 1, wherein the basic material is at least partially coated with the corrosion inhibitor, and production of the corrosion inhibitor takes place during coating with the aid of an at least partially completed acid/base reaction between amine compounds and acids.

16. A method for producing a hydraulic composition comprising a basic material and water, the basic material comprising at least one hydraulic binding agent, the method comprising:

at least partially coating the basic material with a concrete fluidizer and with an additive selected from the group consisting of a flow agent, a retardant, an accelerant, a stabilizer, an aerant, a sealant, and a corrosion inhibitor, and then mixing the at least partially coated basic material and water in a mixer to produce the hydraulic composition, wherein the concrete fluidizer is a polycarboxylate having a structural formula A:

wherein:

M=hydrogen, an alkali metal ion, an alkaline earth metal ion, a two or three valence electron metal ion, an ammonia ion, an ammonia group or mixtures thereof, R=each R is methyl-, $R^1$ and $R^2$=$C_1$ to $C_{20}$ alkyl, cycloalkyl, or alkyl aryl, —$[AO]_n$—R4, wherein A=$C_2$ to $C_4$ alkylene, R4=$C_1$ to $C_{20}$ alkyl, cyclohexyl, or alkyl aryl, and n=2-250, $R^3$=—$NH_2$, —$NR^5R^6$, or —$OR^7NR^8R^9$, wherein $R^5$ and $R^6$ independently of each other are each a $C_1$ to $C_{20}$ alkyl-, cycloalkyl-, or an alkyl aryl or aryl group or a hydroxyalkyl group, or an acetoxyethyl-($CH_3$—CO—O—$CH_2$—$CH_2$—), hydroxyisopropyl —(HO—CH($CH_3$)—$CH_2$—), acetoxyisopropyl group ($CH_3$—CO—O—CH($CH_3$)—$CH_2$—), or $R^5$ and $R^6$ together form a ring, whereof nitrogen forms a part, in order to constitute a morpholine or imidazoline ring, wherein $R^7$ is a $C_2$-$C_4$ alkylene group and $R^8$ and $R^9$ independently of each other are each a $C_1$ to $C_{20}$ alkyl-, cycloalkyl-, alkyl aryl- or an aryl group or a hydroxyalkyl group, a/b/c/d=(0.1-0.9)/(0.1-0.9)/(0-0.8)/(0-0.3), and a+b+c+d=1.

17. The method in accordance with claim 16, wherein the basic material further comprises particles belonging to at least one of a plurality of subgroups, and at least one of the hydraulic binding agent and the particles belonging to the at least one of a plurality of subgroups is coated by the additive.

18. The method in accordance with claim 17, wherein the particles belonging to a subgroup comprise at least one member selected from the group consisting of sand, stone, silica fume, fly ash, foundry sand, light aggregate, slag, and fibers.

19. The method in accordance with claim 16, wherein in order to coat the basic material, the additive is sprayed by at least one of a nozzle and a mixer into a stream of the basic material.

20. The method in accordance with claim 16, wherein the additive is sprayed in a flow direction of the basic material or against the flow direction of the basic material.

21. The method in accordance with claim 16, wherein the additive is coated on the basic material at least partly in liquid form.

22. The method in accordance with claim 21, wherein the additive coated on the basic material is in at least one form selected from the group consisting of atomized (aerosol), broken up into droplets (droplets), and vaporized (vapor).

23. The method in accordance with claim 21, wherein the additive is mixed together with a solvent before being sprayed into a stream of the basic material, and the solvent evaporates after the additive is sprayed into the stream.

24. The method in accordance with claim 23, further comprising transporting the basic material in the stream with a transport air, and adjusting at least one of temperature and relative air humidity of the transport air such that the transport air does not become saturated after the solvent evaporates.

25. The method in accordance with claim 23, wherein energy required to evaporate the solvent is drawn from the basic material to be coated.

26. The method in accordance with claim 16, wherein the additive is coated on the basic material at least partly in powder form.

27. The method in accordance with claim 16, wherein the basic material is conveyed pneumatically in a stream to which the additive is added.

28. The method in accordance with claim 19, wherein a turbulent flow of at least one of the basic material and the additive is produced at a point where the concrete fluidizer is sprayed into the stream.

29. The method in accordance with claim 16, wherein the basic material is at least partially coated with the corrosion inhibitor, and production of the corrosion inhibitor occurs during coating by means of an at least partially completed acid/base reaction between amino compounds and acids.

30. The method in accordance with claim 1, wherein the polycarboxylate having the structural formula A has a mole fraction of each unit a/b/c/d=(0.2-0.8)/(0.19-0.79)/(0-0.1)/(0.01-0.3).

31. The method in accordance with claim 16, wherein the polycarboxylate having the structural formula A has a mole fraction of each unit a/b/c/d=(0.2-0.8)/(0.19-0.79)/(0-0.1)/(0.01-0.3).

32. The method in accordance with claim 1, wherein the basic material is coated with the concrete fluidizer in an amount of 0.3%-1.0% by weight with respect to the weight of the hydraulic binding agent in the basic material.

33. The method in accordance with claim 16, wherein the basic material is coated with the concrete fluidizer in an amount of 0.3%-1.0% by weight with respect to the weight of the hydraulic binding agent in the basic material.

34. A method for producing a coated basic material for a hydraulic composition, the basic material comprising at least one hydraulic binding agent and particles belonging to at least one of a plurality of subgroups, the method comprising:

transporting the basic material to be coated through a conduit of a mixing device, wherein the basic material to be coated is at least one of the hydraulic binding agent and the particles; and during transport of the basic material through the conduit, spraying the basic material with a concrete fluidizer to achieve a coating on the basic material, and allowing the coated basic material to be further transported into a collection or mixing chamber prior to mixing the basic material with water in a hydraulic composition, wherein the concrete fluidizer is in at least one form selected from the group consisting of aerosol, particles, and vapor, and is a polycarboxylate having a structural formula A

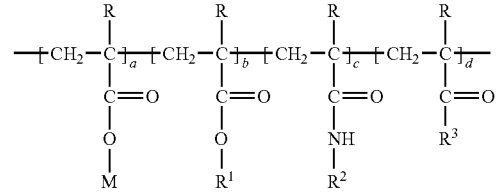

wherein:

M=hydrogen, an alkali metal ion, an alkaline earth metal ion, a two or three valence electron metal ion, an ammonia ion, an organic ammonia group or a mixture thereof, R=each R is independently methyl, $R^1$ and $R^2$=$C_1$ to $C_{20}$ alkyl, cycloalkyl, or alkyl aryl, —[AO]$_n$—R4, wherein A=$C_2$ to $C_4$, alkylene, R4=$C_1$ to $C_{20}$ alkyl, cyclohexyl, or alkyl aryl, and n=2-250, $R^3$=—$NH_2$, —$NR^5R^6$, or —$OR^7NR^8R^9$, wherein $R^5$ and $R^6$ independently of each other are each a $C_1$ to $C_{20}$ alkyl-, cycloalkyl-, or alkyl aryl or aryl group or a hydroxyalkyl group, or an acetoxyethyl-($CH_3$—CO—O—$CH_2$—$CH_2$—), hydroxyisopropyl-(HO—CH($CH_3$)—$CH_2$—), acetoxyisopropyl group ($CH_3$—CO—O—CH($CH_3$)—$CH_2$—), or $R^5$ and $R^6$ together form a ring, whereof nitrogen forms a part, in order to constitute a morpholine or imidazoline ring, wherein $R^7$ is a $C_2$-$C_4$ alkylene group and $R^8$ and $R^9$ independently of each other are each a $C_1$ to $C_{20}$ alkyl-, cycloalkyl-, alkyl aryl- or an aryl group or a hydroxyalkyl group, a/b/c/d=(0.1-0.9)/(0.1-0.9)/(0-0.8)/(0-0.3), and a+b+c+d=1.

35. The method in accordance with claim 34, wherein at least one of sand and stone is employed as a said subgroup of the basic material.

36. The method in accordance with claim 34, wherein the particles belonging to a subgroup comprise at least one member selected from the group consisting of silica fume, fly ash, light aggregate, slag, foundry sand, and fibers.

37. A method for producing a coated basic material for a hydraulic composition, the basic material comprising at least one hydraulic binding agent and particles belonging to at least one of a plurality of subgroups, the method comprising:

at least partially coating the basic material with a concrete fluidizer without previously or simultaneously mixing the basic material with water in a hydraulic composition, wherein the concrete fluidizer is a polycarboxylate having a structural formula A

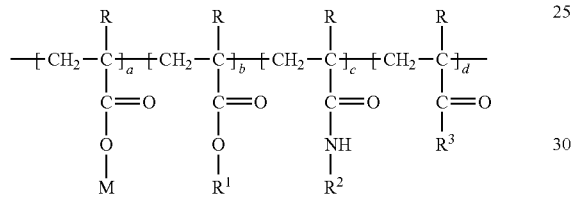

wherein:

M=hydrogen, an alkali metal ion, an alkaline earth metal ion, a two or three valence electron metal ion, an ammonia ion, an organic ammonia group or a mixture thereof, R=each R is methyl, $R^1$ and $R^2$=$C_1$ to $C_{20}$ alkyl, cycloalkyl, or alkyl aryl, —[AO]$_n$—R4, wherein A=$C_2$ to $C_4$, alkylene, R4=$C_1$ to $C_{20}$ alkyl, cyclohexyl, or alkyl aryl, and n=2-250, $R^3$=—NH$_2$, —NR$^5$R$^6$, or —OR$^7$NR$^8$R$^9$, wherein $R^5$ and $R^6$ independently of each other are each a $C_1$ to $C_{20}$ alkyl-, cycloalkyl-, or alkyl aryl or aryl group or a hydroxyalkyl group, or an acetoxyethyl-(CH$_3$—CH—O—CH$_2$—CH$_2$—), hydroxyisopropyl group-(HO—CH(CH$_3$)—CH$_2$—), acetoxyisopropyl group (CH$_3$—CO—O—CH(CH$_3$)—CH$_2$—), or $R^5$ and $R^6$ together form a ring, whereof nitrogen forms a part, in order to constitute a morpholine or imidazoline ring, wherein $R^7$ is a $C_2$-$C_4$ alkylene group and $R^8$ and $R^9$ independently of each other are each a $C_1$ to $C_{20}$ alkyl-, cycloalkyl-, alkyl aryl- or an aryl group or a hydroxyalkyl group, a/b/c/d=(0.1-0.9)/(0.1-0.9)/(0-0.8)/(0-0.3), and a+b+c+d=1.

38. A method for producing a hydraulic composition comprising a basic material and water, the basic material comprising at least one hydraulic binding agent, the method comprising:

at least partially coating the basic material with an additive; and then mixing the at least partially coated basic material and water in a mixer to produce the hydraulic composition, wherein the additive is a concrete fluidizer that is a polycarboxylate having a structural formula A:

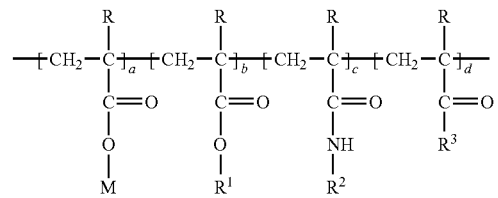

wherein:

M=hydrogen, an alkali metal ion, an alkaline earth metal ion, a two or three valence electron metal ion, an ammonia ion, an ammonia group or mixtures thereof, R=each R is independently methyl, $R^1$ and $R^2$=$C_1$ to $C_{20}$ alkyl, cycloalkyl, or alkyl aryl, —[AO]$_n$—R4, wherein A=$C_2$ to $C_4$ alkylene, R4=$C_1$ to $C_{20}$ alkyl, cyclohexyl, or alkyl aryl, and n=2-250, $R^3$=—NH$_2$, —NR$^5$R$^6$, or —OR$^7$NR$^8$R$^9$, wherein $R^5$ and $R^6$ independently of each other are each a $C_1$ to $C_{20}$ alkyl-, cycloalkyl-, or an alkyl aryl or aryl group or a hydroxyalkyl group, or an acetoxyethyl-(CH$_3$—CO—O—CH$_2$—CH$_2$—), hydroxyisopropyl-(HO—CH(CH$_3$)—CH$_2$—), acetoxyisopropyl group (CH$_3$—CO—O—CH(CH$_3$)—CH$_2$—), or $R^5$ and $R^6$ together form a ring, whereof nitrogen forms a part, in order to constitute a morpholine or imidazoline ring, wherein $R^7$ is a $C_2$-$C_4$ alkylene group and $R^8$ and $R^9$ independently of each other are each a $C_1$ to $C_{20}$ alkyl-, cycloalkyl-, alkyl aryl- or an aryl group or a hydroxyalkyl group, a/b/c/d=(0.1-0.9)/(0.1-0.9)/(0-0.8)/(0-0.3), and a+b+c+d=1.

39. A method for producing a coated basic material for a hydraulic composition, the basic material comprising at least one hydraulic binding agent and particles belonging to at least one of a plurality of subgroups, the method comprising:

conveying the basic material to be coated pneumatically or gravitationally in a stream, wherein the basic material to be coated is at least one of the hydraulic binding agent and particles; and spraying a concrete fluidizer into the stream to coat the basic material prior to mixing the basic material with water in a hydraulic composition, wherein the concrete fluidizer is a polycarboxylate having a structural formula A

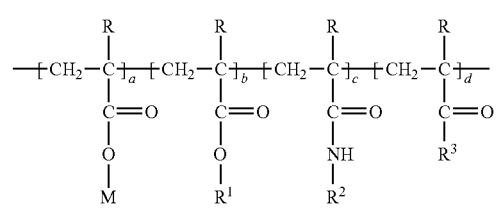

wherein:

M=hydrogen, an alkali metal ion, an alkaline earth metal ion, a two or three valence electron metal ion, an ammonia ion, an organic ammonia group or a mixture thereof, R=each R is independently methyl, $R^1$ and $R^2$=$C_1$ to $C_{20}$ alkyl, cycloalkyl, or alkyl aryl, —[AO]$_n$—R4,
  wherein A=$C_2$ to $C_4$, alkylene, R4=$C_1$ to $C_{20}$ alkyl, cyclohexyl, or alkyl aryl, and n=2-250, $R^3$=—$NH_2$, —$NR^5R^6$, or —$OR^7NR^8R^9$,
  wherein $R^5$ and $R^6$ independently of each other are each a $C_1$ to $C_{20}$ alkyl-, cycloalkyl-, or alkyl aryl or aryl group or a hydroxyalkyl group, or an acetoxyethyl-($CH_3$—CO—O—$CH_2$—$CH_2$—), hydroxyisopropyl-(HO—CH($CH_3$)—$CH_2$—), acetoxyisopropyl group ($CH_3$—CO—O—CH($CH_3$)—$CH_2$—),
  or $R^5$ and $R^6$ together form a ring, whereof nitrogen forms a part, in order to constitute a morpholine or imidazoline ring,
  wherein, $R^7$ is a $C_2$-$C_4$ alkylene group and $R^8$ and $R^9$ independently of each other are each a $C_1$ to $C_{20}$ alkyl-, cycloalkyl-, alkyl aryl- or an aryl group or a hydroxyalkyl group, a/b/c/d=(0.1-0.9)/(0.1-0.9)/(0-0.8)/(0-0.3), and a+b+c+d=1; and the concrete fluidizer is coated on the basic material in at least one form selected from the group consisting of aerosol and vapor.

40. The method in accordance with claim 34, wherein the concrete fluidizer is sprayed by nozzles located at two separate locations of the conduit.

\* \* \* \* \*